United States Patent [19]

DeMoss et al.

[11] 3,969,733

[45] July 13, 1976

[54] SUB-HARMONIC PHASE CONTROL FOR AN INK JET RECORDING SYSTEM

[75] Inventors: Richard A. DeMoss; Howard T. Hilton, both of San Jose, Calif.

[73] Assignee: International Business Machines Corporation, Armonk, N.Y.

[22] Filed: Dec. 16, 1974

[21] Appl. No.: 532,968

[52] U.S. Cl. .......... 346/1; 346/75

[51] Int. Cl.$^2$ .......... G01D 18/00

[58] Field of Search .......... 346/75, 1

[56] References Cited

UNITED STATES PATENTS

| | | | |
|---|---|---|---|
| 3,465,351 | 9/1969 | Keur et al. | 346/75 |
| 3,761,941 | 9/1973 | Robertson | 346/75 X |
| 3,769,630 | 10/1973 | Hill et al. | 346/75 |
| 3,769,632 | 10/1973 | Julisburger | 346/75 |
| 3,836,912 | 9/1974 | Ghougasian et al. | 346/75 |

*Primary Examiner*—Joseph W. Hartary

*Attorney, Agent, or Firm*—John H. Holcombe

[57] ABSTRACT

Sub-harmonic charging and detection of charging phase synchronization in an ink jet system employing electrostatic deflection of individual ink jet droplets. The phase control employs filtration/narrow-band amplification at a sub-harmonic frequency from the normal drop repetition frequency, such that noise and extraneous drop rate machine signals are filtered. Sensing may best be accomplished by an inductive charge sensing element and detection of the filtered sensed signals by integration and by level detection.

10 Claims, 9 Drawing Figures

SUB-HARMONIC PHASE CONTROL FOR AN INK JET RECORDING SYSTEM

CROSS-REFERENCE TO RELATED APPLICATIONS

The present application may be advantageously employed with the ink jet synchronization system of U.S. Pat. No. 3,769,630, issued Oct. 30, 1973, of J. D. Hill et al.

BACKGROUND OF INVENTION

In recent years, significant development work has been done in the field of ink jet printing. One type of ink jet printing involves electrostatic pressure ink jet, wherein electrostatic ink is applied under pressure to a suitable nozzle. The ink is thus propelled from the nozzle in a stream which is caused to break up into a train of individual droplets which must be selectively charged and controllably deflected for recording or to a gutter. The droplet formation may be controlled and synchronized by a number of different methods available in the art including physical vibration of the nozzle, pressure perturbations introduced into the ink supply at the nozzle, etc. The result of applying such perturbations to the ink jet is to cause the jet stream emerging from the nozzle to break into uniform droplets at the perturbation frequency and at a predetermined distance from the tip of the nozzle. It is of utmost necessity in such systems to precisely synchronize the application of the appropriate charging signal to the ink droplet stream at the precise time of droplet formation and breakoff from the stream. Means for supplying the selected electrostatic charge to each droplet produced by the nozzle conventionally comprise a suitable charging circuit and an electrode surrounding or adjacent to the ink stream at the location where the stream begins to form such droplets. Charging signals are applied between a point of contact with the ink and the charging electrode. A drop will thus assume a charge determined by the amplitude of the particular signal on the charging electrode at the time that the drop breaks away from the jet stream. The drop thereafter passes through a fixed electric field and the amount of deflection is determined by the amplitude of the charge on the drop at the time it passes through the deflecting field. A recording surface is positioned downstream from the deflecting means such that the droplet strikes the recording surface and forms a small spot. The position of the drop on the writing surface is determined by the deflection the drop experiences, which in turn is determined by the charge from the droplet. By suitably varying the charge, the location at which the droplet strikes the recording surface may be controlled with the result that a visible, human readable, printed record may be formed upon the recording surface. U.S. Pat. No. 3,596,275 of Richard G. Sweet entitled "Fluid Droplet Recorder" discloses such a recording or printing system.

The time that the drop separates from the fluid stream emerging from the nozzle is quite critical, since the charge carried by the droplet is produced at that moment by electrostatic induction. The field established by the charging signal is maintained during drop separation, and the drop will carry a charge determined by the instantaneous value of the signal at breakoff. In order to place exact predetermined charges on individual droplets in accordance with successive video signals, it is necessary to know exactly the time of drop breakoff in relationship to the timing of the charge signal. Stated differently, the droplet breakoff time and the application of the charge signal must be very precisely synchronized. Failure to properly synchronize drop breakoff and the charging signal results in very imprecise control of the printing process with attendant degradation of the print quality.

Synchronization may also be important in the binary type electrostatic printing wherein uncharged drops are not deflected and proceed directly to impact recording medium, whereas charged drops are deflected to the gutter. U.S. Pat. No. 3,373,437 of Richard G. Sweet et al entitled "Fluid Droplet Recorder with a Plurality of Jets" discloses such a recording or printing system.

In this type of system, if synchronization is not correct such that the charging signal is in the process of either rising or falling at the time of drop breakoff, the exact charge of the drop will be some time function of the maximum charge signal rather than being fully charged. Such drops may be deflected by an amount too small to cause impact with the gutter, but instead would impact the recording medium at an unintended position.

With respect to the problem of obtaining proper synchronization between the charged signal and drop breakoff, the prior art definitely recognized the criticality of the synchronization problem and many techniques have ben proposed to test the drops for proper charging and adjust the synchronization between the charging signals and the perturbation means. The following U.S. patents are representative of the prior art: Lewis et al, U.S. Pat. No. 3,298,030; Keur et al, U.S. Pat. No. 3,465,350; Keur et al U.S. Pat. No. 3,465,351; Lovelady et al U.S. Pat. No. 3,596,276; Hill et al U.S. Pat. No. 3,769,630 (above); Julisburger et al U.S. Pat. No. 3,769,632; and Ghougasian et al, U.S. Pat. No. 3,836,912.

The Lewis et al patent describes drop synchronization using a phase shifter to ensure proper charging of drops at the correct time. The Keur et al, U.S. Pat. No. 3,465,350, describes the use of a test 33kHz. train of slightly narrowed pulses to charge drops for deflection to a test electrode, which is impacted only by fully charged drops. The detector thus supplies an output signal only when the phasing is correct. The Keur et al U.S. Pat. No. 3,465,351 describes similar charging of the drops and the implacement of a target bar so that all drops strike the bar, together with an integrated measurement of the total current given out by the drops to indicate proper or improper phasing. In both patents, the 33kHz. charging rate for the test signals is the normal charging rate for the printing video signal. The Lovelady et al patent also charges each drop of the stream to impact the gutter and directly compare the resultant gutter voltage against the reference voltage to establish whether the appropriate phase relationship exists. The Hill et al patent discloses a dual gutter arrangement for using the voltage resulting from drops impacting at either extreme of deflection for detecting whether proper phasing has been achieved. The Julisburger et al patent discloses the use of slightly narrowed selective phase charging signals for testing the phase adjustment of each of a series of drops and an induction sensing means and digital phase detection circuitry for determining whether the drops are properly synchronized. The Ghougasian et al patent is directed to a specific induction sensing means located near the charge electrode and prior to the deflection means useful for synchronization detection.

With the exception of the Keur et al U.S. Pat. No. 3,465,350 and the Ghougasian et al patents, all of the foregoing art is subject to very poor signal to noise ratios on the detected signals and, as the result, is subject to a high probability of inaccuracy, or requires an intricate array of shielding to attempt to reduce the signal to noise to usable levels. The Ghougasian et al patent simply describes an induction sensor which may be utilized with the system of the Julisburger patent. The Keur et al U.S. Pat. No. 3,465,350 patent is primarily an aiming test which may be affected by other parameters.

SUMMARY OF THE INVENTION

In accordance with the present invention, an improved synchronization detection system for the detection of synchronization between the ink droplet formation means and the drop charging means may be affected by applying a charge to ones of a stream of droplets as they are being formed, the droplets selected to comprise a subharmonic of the normal drop charging frequency, and each charging signal comprising a fraction of the normal charging signal. An induction sensing means at the gutter is utilized to sense the charged drops and detection circuitry sensitive to the subharmonic frequency senses and integrates the detected signals for comparison to a predetermined signal to detect a deviation from the desired phase.

The present invention is therefore highly accurate as the result of being relatively insensitive to machine noise.

The present invention may also be employed singly with a plurality of ink jet heads which are in a multihead arrangement.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
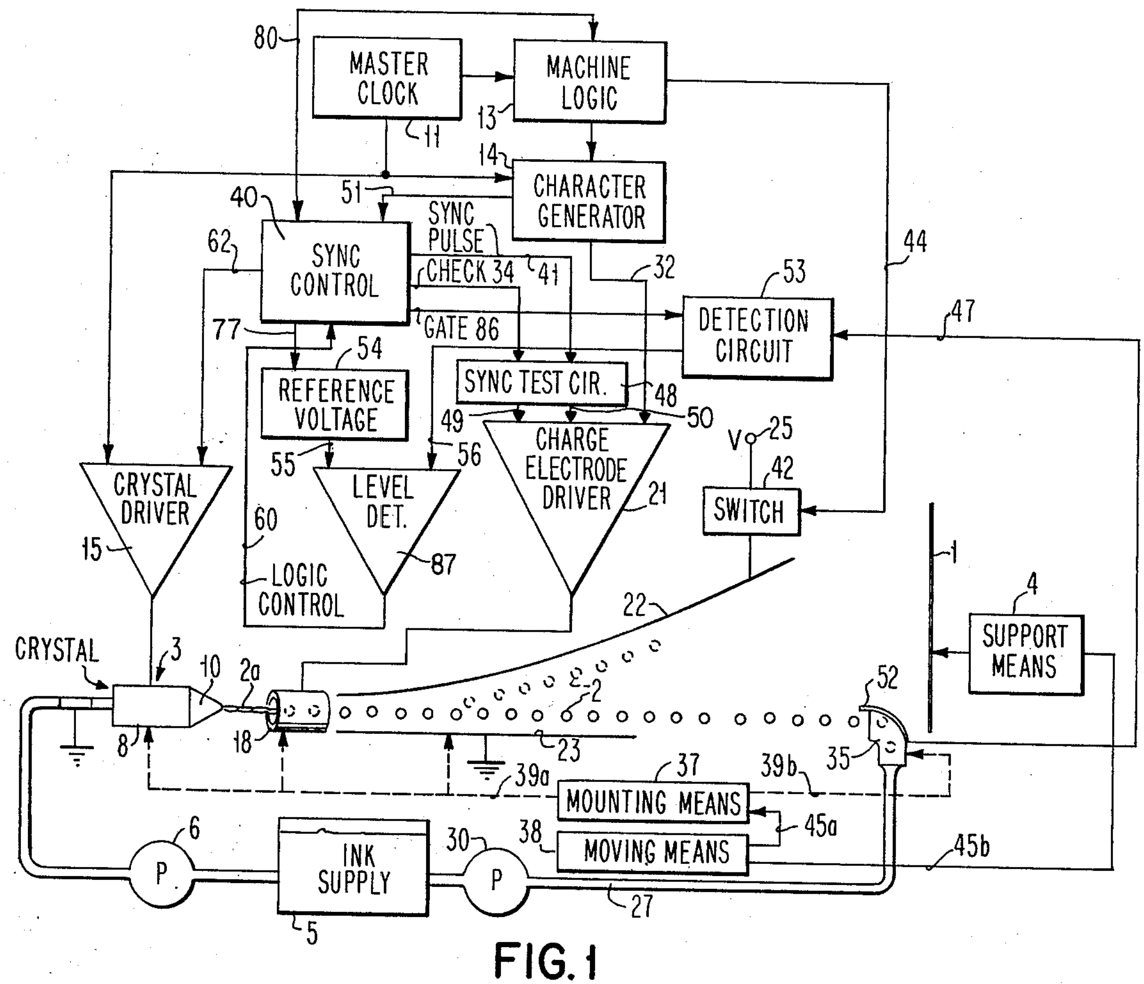
FIG. 1 is a diagram of an ink jet printing system incorporating the synchronization checking technique and arrangement of the present invention.

The ink jet printing system of FIG. 1 is of the electrostatic pressure deflected type for recording characters or symbols on a record member, such as a sheet of paper 1 by the selective charging of ink drops 2 by various amounts. The drops move in a stream at a high speed from a source 3 for deposition on the paper, which is supported by means 4. Ink from an ink supply 5 is directed by means of a pump 6 to the source 3, which incorporates a vibrating means or transducer, such as a piezoelectric crystal 8, for perturbating the ink pressure. The source 3 also includes a nozzle 10 through which the ink is propelled in a stream by the ink pressure. The ink stream breaks into a stream of uniform droplets in accordance with the pressure perturbation from crystal 8. A master clock 11 provides basic timing pulses to the system including machine logic 13 and a character generator 14. Crystal 8 is driven at the frequency provided by clock 11 under control of a crystal driver 15. The frequency supplied to the crystal may be a very high range such as 80kHz., or more. The stream 2*a* is directed through the center of a charge electrode 18 and breaks into a series of individual droplets within the charge electrode. The specific charge assumed by an individual droplet is based upon the voltage applied to the charge electrode at the time of drop breakoff. The resultant characters on paper 1 may be formed as a matrix of droplets, for instance, 24 droplets wide by 40 droplets high. In order to control the placement of drops on paper 1, a variable charging voltage is provided to charge electrode 18 from charge electrode driver 21. The individual drops are directed between deflection plates 22 and 23 having a high voltage level, such as 3000 volts, supplied from terminal 25, via switch 42. The constant potential which exists between plates 22 and 23 combines with the variable charging of drops 2 to thus effect selective displacement of the drops in a vertical direction, for example, to any one of the 40 possible positions in the print matrix. Unused drops, which are uncharged, continue on the initial path, undeflected to the gutter 35. These drops are returned by line 27 under control of pump 30 to ink supply reservoir 5. The proper voltage to be applied to drops 2 by charge electrode 18 from driver 21 during printing of characters supplied by character generator 14 on line 32. In the illustrated embodiment, character generator 14 is under the timing control of master clock 11, such that the phase of the charging signals therefrom on line 32 is not alterable. As illustrated, deflection of the individual drops 2 may be accomplished in the vertical direction so as to selectively produce columns or parts of columns from the droplets on the record medium 1. The source 3 and elements 8, 10, 18, 20, 23, and 35 are customarily mounted on a mounting means 37 interconnected with said elements by dashed lines 39*a* and 39*b*. Formation of a plurality of columns of droplets in a horizontal direction is effected by relative movement of paper 1 with respect to source 3 and to electrodes 18, 22 and 23 in a timed fashion to achieve a side-by-side arrangement of columns. This may be accomplished by moving means 38 which is interconnected to mounting means 37 by line 45*a* and to support means 4 by line 45*b*. This movement may be effected on an incremental basis or on a continuing basis. In this manner, entire lines on a document are printed. Ordinarily, at the end of each line of printing, the ink drop generating and deflecting means is relatively displaced with respect to paper 1 vertically to a succeeding line or to a succeeding page. During this time, the subject synchronizing and checking procedure may be employed to control the timing of the operation of crystal driver 15 to thereby control the relative timing of the drop formation with respect to the timing of charging by electrode 18.

As previously discussed, in a synchronized pressure ink jet system of the type described, the drop breakoff and charge voltage timing must be precisely synchronized. Similar synchronization is also a requirement of the binary type of pressure ink jet system discussed with respect to the Sweet et al patent, above. Synchronization requires that the charge voltage applied by electrode 18 shall have reached the proper desired value prior to the actual breakoff of the drop 2 from the stream 2*a*, and that the charge voltage must not be changing at the time of drop breakoff. The technique and apparatus of the present invention is arranged to provide an improved sensing and detection of the degree of synchronization of drop formation time with respect to drop charging and provide the appropriate feedback signal to allow automatic adjustment thereof for proper synchronization.

An embodiment of the present system is illustrated in FIG. 1. In the figure, sync control 40 supplies sync pulse line 41 and check line 34 to sync test circuit 48. The sync test circuit is connected to charge electrode driver 21 by lines 49 and 50. The test signals supplied on lines 41 and/or 43 by sync control 40 are controlled by character generator 14, via line 51 under the control of machine logic 13. The machine logic also supplies a switching signal on line 44 to switch 42. Switch 42 responds to the switch signal on line 44 to disable the high voltage from terminal 25 to deflection plate 22. Drops having test charges from driver 21 and charge electrode 18 thus are not deflected due to the absence of a high voltage field and impact gutter 35. The signals therefrom generated by sensor 52 are applied to the detection circuit 53. The detection circuit supplies its output on line 56 to level detector 87. The level detector compares the resultant amplitude of the detection circuit to a reference voltage supplied from circuit 54 via line 55 to indicate whether synchronization was achieved. The resultant logic control signal is suppled on line 60 to sync control 40. The sync control is connected to crystal driver 15 by line 62. The sync control may supply a control signal thereon to adjust the phase of the crystal driver 15, thereby adjusting the timing of drop separation. The reference voltage 54 is applied on line 55 in response to a signal on line 77 from sync control 40 which also sets the reference level in accordance with the type of testing to be made. The sync pulse and check testing as signaled individually on lines 41 or 34 by sync control 40 are discussed in the reference U.S. Pat. No. 3,769,630, and require a different reference voltage from that of the present invention. The connecting lines to gutter 35, switching circuitry and amplifier for detecting the other test signals as disclosed in the referenced patent are not shown here.

Figure 2:
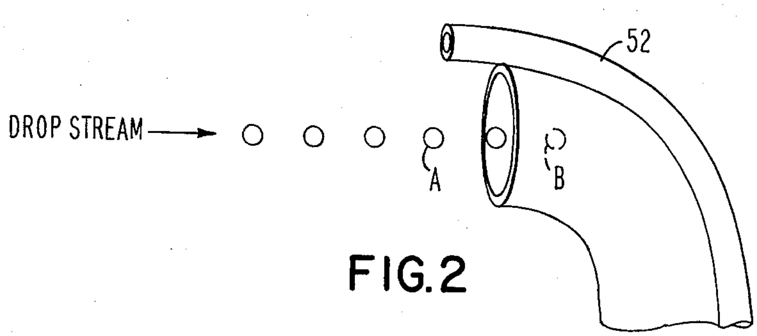
FIG. 2 is a perspective view of a gutter and an induction sensing means in accordance with the present invention.

FIG. 2 comprises an illustration of an exemplary induction sensing means for the present invention. The sense electrode is simply an insulated, unshielded wire tip extending beyond sump or gutter 35. For example, the tip may extend approximately 0.020 inches to 0.030 inches beyond the gutter. Charged drops which are near the sump use the sense wire and sump as the ground for the drop charges to terminate their field lines. Thus, as a charged drop passes from position A to position B, it passes from a condition where the sense electrode is a significant ground to one where it is almost totally shielded from the drop by the sump 35. This generates an alternating current in the sense electrode, the magnitude of which is dependent upon the drop charge, the drop repetition rate and the geometry.

As an example, currents of 1 to 20 nanoamperes can be generated, leading to signals of 50 microvolts to 1 millivolt into a 50,000 ohm load. By dropping the deflection field so that all drops, whether charged or uncharged, proceed along the same path to the gutter, and by controlling the charged drop repetition rate, the magnitude of this current and the derived voltage, are dependent upon the drop charge. An alternative sensing means will be discussed with respect to FIG. 9.

Figure 3:
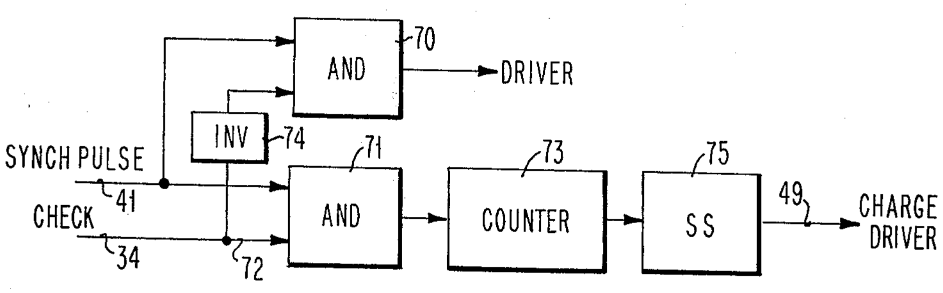
FIG. 3 is a diagram of an exemplary charging circuit in accordance with the present invention.

FIG. 3 illustrates the sync test circuit 48. The sync pulses on line 41 from sync control 40 are supplied at the normal machine drop charging rate and are centered with respect to the normal charging window. These signals are supplied to AND circuits 70 and 71. A check signal on line 34 controls which of the AND circuits 70 or 71 will transmit the sync pulses. An application of the check signal to gate input 72 of AND circuit 71 operates the AND circuit to cause transmission of the sync pulses to counter 73. An absence of the check signal on line 34 operates inverter 74 to supply a signal to AND circuit 70 which transmits any applied sync pulses directly to the charge electrode driver 21. The direct application of the sync pulses is shown in the referenced U.S. Pat. No. 3,769,630, and does not form a part of the present invention. The direct application of the check signal on line 34 to the driver is not permitted in this embodiment. Counter 73 is arranged to count a predetermined number of sync pulses and to apply a signal to single shot 75 upon receipt of the last sync pulse. The counter continues cyclically counting in this fashion, thus supplying pulses to single shot 75 at a sub-harmonic frequency of the sync pulse machine charging rate. Single shot 75 responds to application of the pulse from counter 73 to supply a pulse of predetermined length on line 49 to charge electrode driver 21. This pulse is a predetermined fraction of the normal charging window from character generator 32, and is centered with respect to the normal charging window.

The operation of the circuitry of FIG. 3 thus results in an application by the charge electrode driver 21 to charge electrode 18 of a series of pulses a predetermined fraction of the normal charge window width at a predetermined sub-harmonic frequency of the normal charging rate. As will be described, a preferred embodiment is to utilize test charging pulses one-quarter the normal charge window width provided at one-quarter the normal drop charge repetition rate. Thus, counter 73 is a ring counter which counts to 4, providing a pulse output to single shot 75 upon obtaining the count of 4.

Figure 4:
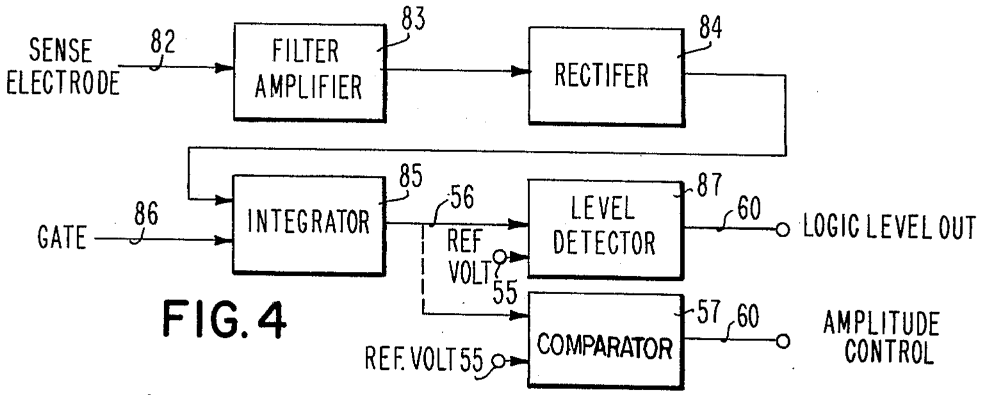
FIG. 4 is a diagram of an exemplary drop charge detection circuit in accordance with the present invention.

The detection circuit is illustrated in FIG. 4. The output of sense electrode 52 on line 47 and switch 46 is supplied to the detection circuit 53 of FIG. 4 on line 82. Line 82 is connected to filter amplifier 83 which amplifies signals in a very narrow band about the sub-harmonic charge drop repetition rate. The output of the filter amplifier is then rectified by rectifier 84 and supplied to integrator 85. The integrator 85 is unclamped by a gate signal on line 86 from sync control 40. The gating signal is the same as the signal appearing on line 34, but delayed a predetermined amount to compensate for the time required for sensing of drops charged by charge electrode driver 21, due primarily to the travel time required for the drops to reach gutter 35. By means of the application of the gating signal on line 86 to integrator 85 at the time the drop train is expected at the sense electrode, the integrator output is therefore the total filtered signal seen as the result of the test series of charged drops. Thus, the level detector 87 indicates whether the drops were fully charged.

The output of integrator 85 is supplied to level detector 87 which compares the output of integrator 85 and supplies an output signal upon the output of integrator 85 reaching the preset level from reference voltage circuit 54. Transmission of the signal on line 60 indicates to sync control 40 that the system is presently synchronized. Absence of such a signal during the testing period indicates that the system is out of synchronization, causing the sync control to apply an adjustment signal on line 62 to crystal driver 15. Upon such adjustment, the sync test is repeated.

Alternatively, level detector 87 may be replaced with the comparator 57 of the above U.S. Pat. No. 3,769,630 to indicate by the amplitude of the output of integrator 85 the amount of phase adjustment that is to be made by sync control 40. This is also illustrated by the dashed line portion of FIG. 4.

Figure 5:
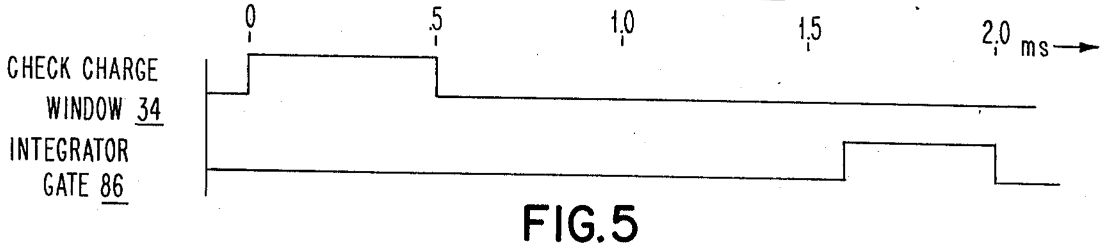
FIGS. 5, 6 and 7 comprise a series of waveforms illustrating the pulses and signals of the disclosed embodiment of the invention.
Figure 6:
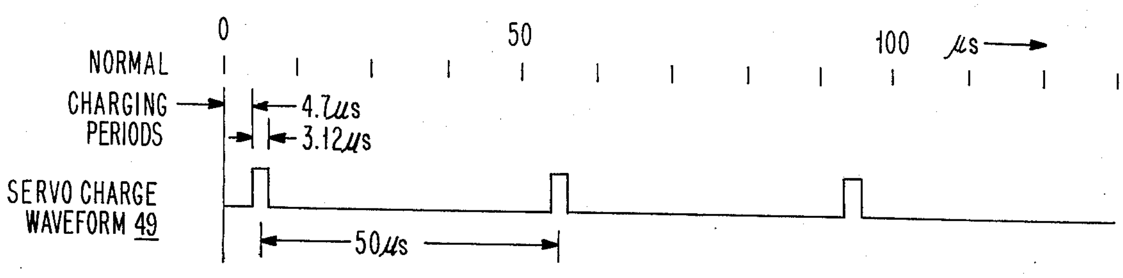
Figure 7:
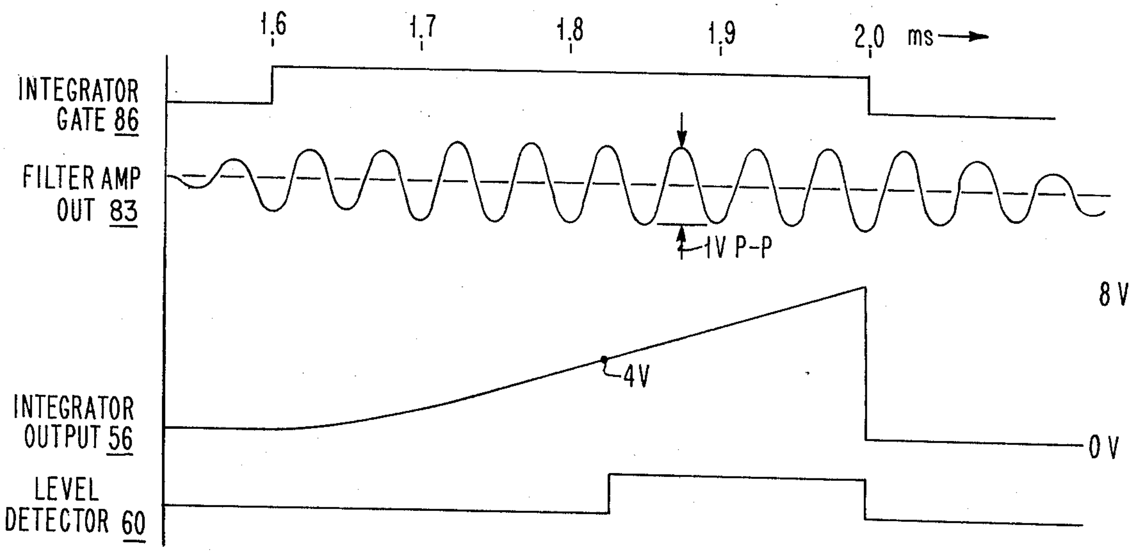

FIGS. 5, 6 and 7 comprise a timing diagram of the drive signals and the expected responses for the above exemplary embodiment of the invention. It is important to note that the figures are not drawn with the same relative scales. FIG. 5 represents the check charge window comprising the signal on line 34 and the integrator gate signal on line 86 for controlling the relative operating timing of the synchronization testing circuitry of the present invention. As an example, the integrator gating signal is related to the charge window by unclamping the integrator from 1.6 milliseconds after the charge train begins to 2 milliseconds after the charge train ends. This particular relationship is only proper with the assumed parameters of an ink jet system which include an 80kHz drop generation rate and a 1.5 millisec. flight time to the sump.

FIG. 6 illustrates the test charging waveform from the operation of the sync circuit of FIG. 3. The normal 12.5 microsecond charging periods for the 80kHz drop generation rate are shown together with the test charge waveform having a pulse width of 3.125 microseconds, which are repeated at 50-microsecond intervals.

FIG. 7 illustrates the waveforms resulting from the operation of the detection circuit of FIG. 4. The same integrator gate signal on line 86 as is shown in a different scale on FIG. 5 is repeated in FIG. 7 on an expanded scale. Also shown is the output of filter amplifier 83 and the resultant output on line 56 of integrator 85, together with the output on line 60 of level detector 87. The signals in FIG. 7 are based upon the following exemplary characteristics of the circuitry of FIG. 4. The filter amplifier 83 for example may have a gain of 8,000 at a center frequency of 20kHz. and a bandwidth of 2kHz. with two poles near 20kHz. The rectifier 84 may be arranged to supply a 2 milliamp average D.C. output for a 1-volt peak-to-peak alternating input. The level detector may be arranged to provide an output upon reaching an input level of 4 volts. The sensed signals are based upon every fourth drop having been properly charged with a charge pulse one-quarter as wide as the normal pulse and a pulse amplitude of 50 volts. As a result, the raw sensor current at sensor 52 would be approximately 2.5 nanoamperes at 20kHz. if the stream charges properly. This would represent approximately 0.125 millivolts into a 50,000-ohm load.

Figure 8:
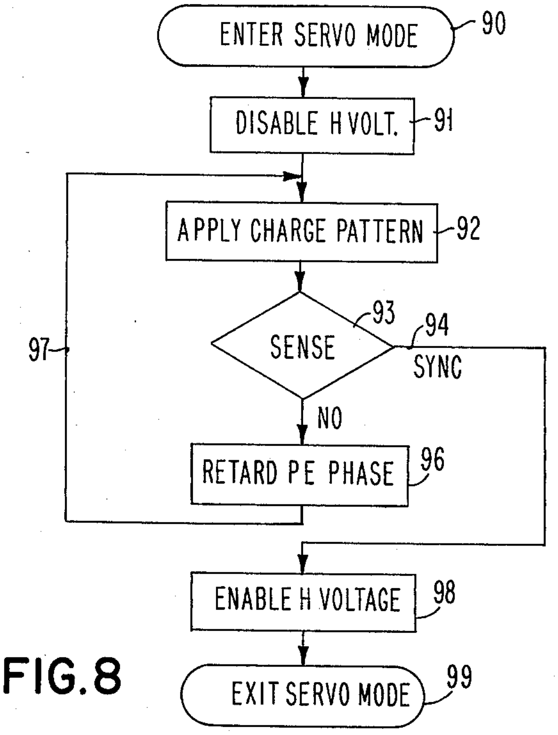
FIG. 8 is a flowchart showing the sequence of steps of the present synchronizing system.

FIG. 8 represents an exemplary flowchart for operating the testing and synchronization of the ink jet system of FIG. 1. The servo mode is entered at step 90, which may comprise an automatic procedure during a stepping from page to page operation of the ink jet system. At step 91, the switching signal is supplied on line 44 to disable the application of the high voltage to deflection plate 22. Step 92 represents the operation of sync control 40 and sync circuit 48 to apply the test charge pattern to the drops at charge electrode 18. Step 93 represents the application of the gate signal on line 86 by sync control 40 to the detection circuit 53 and branches 94 and 95 represent, respectively, the presence or absence of the logic output signal on line 60 from level detector 87. Upon the absence of the logic output signal, step 96 comprises the operation of sync control 40 supplying an adjustment signal on line 62 to retard the phase of the piezoelectric crystal driver 15 by approximately one-eighth cycle. Upon completion of this step, the procedure returns by path 97 to again apply the charge pattern in step 92. Upon achieving an output on line 60 from level detector 87, branch 94 leads to step 98. At this step, sync control 40 indicates to machine logic 13 on line 80 that the system is properly synchronized and the machine logic responds by operating switch 42 to connect high voltage 25 to the deflection plate 22. The servo mode is then exited in step 99 to return the system to normal printing of the next page.

The disclosed system is operable without switch 42 and steps 91 and 98 for disabling the high voltage if the charging pulses supplied from sync circuit 48 and charge electrode driver 21 to charge electrode 18 are significantly reduced in amplitude. As an example, an amplitude of 8 volts will keep the drops in a gutter having 15 mil additional height. This results in a significantly lower signal to be sensed by induction sensor 52, but this has proven to provide acceptable signals. Thus, the subject invention of charging drops at a sub-harmonic frequency of the normal machine frequency becomes even more important for allowing a suitable sensing and detection of the drops. In this circumstance, the testing may be preformed automatically between lines without formal entry into or exit from the servo mode as shown by steps 90 and 99. As a further alternative, servo mode may be entered at the discretion of the machine operator upon noticing that the quality of printing has decreased by means of appropriate signals to the machine logic 13.

Figure 9:
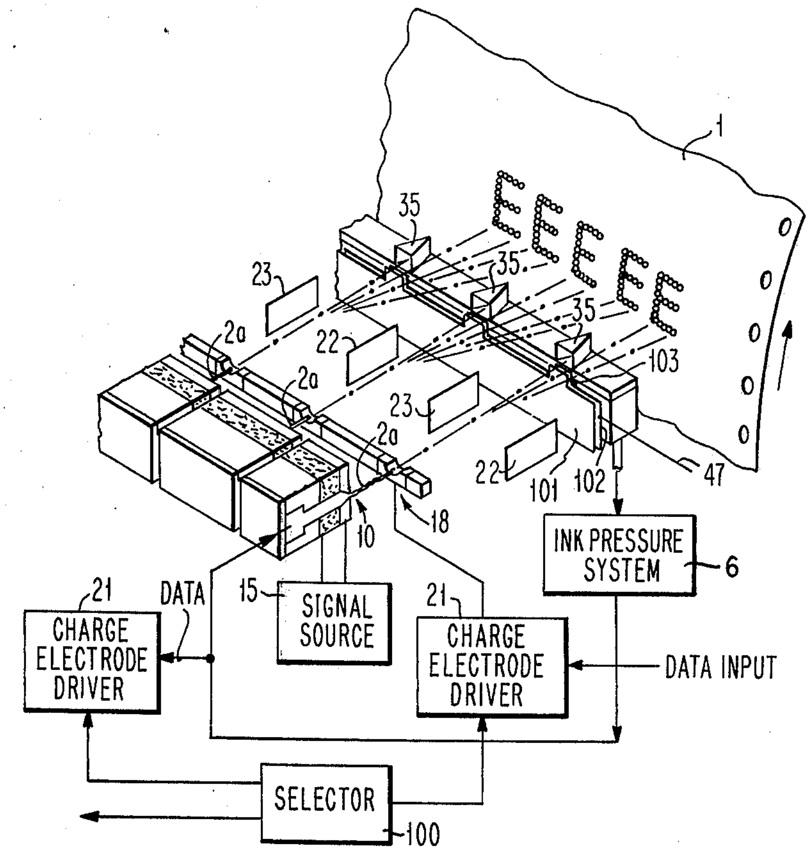
FIG. 9 is a perspective diagrammatic view of a multihead embodiment of the present invention.

A multi-head embodiment is illustrated in FIG. 9 with multiple crystals 3, charge electrodes 18, and gutters 35. The circuitry of the embodiment of FIG. 9 is the same as that of FIG. 1 with certain exceptions. Specifically, common machine logic 13 and a common master clock 11 may be utilized, but the crystal driver 15, character generator 14, and charge electrode driver 21 is duplicated for each head. Sync control 40 is also partially duplicated to provide a separate sync control line 62 to each crystal driver 15. The deflection plates 22 and 23 are alternately poled rather than poled and grounded. Thus, the charge electrode drivers 21 are arranged to supply opposite polarity charge pulses to alternate heads.

A feature of the present invention is that only one sync test circuit 48, one detection circuit 53, one reference voltage 54, and one level detector 87 are required to sequentially test the synchronization of all the heads, exactly as shown in the previous Figures. A selector 100 is arranged to sequentially select each charge electrode driver for testing, and to select all charge electrode drivers for printing. Thus, during testing, only the droplets of the stream to be tested are charged, all other heads delivering only uncharged droplets.

The sensor 52 may be duplicated for each gutter 35 and connected to the same detection circuit 53 for sync testing exactly as for the embodiment described above.

An alternative sensor is shown in FIG. 9, comprising two parallel plates 101 and 102. Both plates include protrusions 103 which extend to just below the flight path of ink drops which are directed to gutters 35. The front plate 101 is a grounded shield and rear plate 102 is a common sensor probe for all of the ink jet heads. The shield 101 is required because of the large surface area presented by the sensor plate 102. The sensor plate thus detects a test charged droplet only as it crosses above the shield 101.

The signal generated by the sensor is the same as that of sensor 52 because gutter 35 acts as a shield in the same way in FIG. 9 as in the previous figures. The resultant signal is therefore supplied on line 47 to the detection circuit 53. Sync control 40 responds to level detector 87 as before and adjusts the crystal driver 15 of the selected head if required.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of synchronizing an ink recording system of the type wherein a stream of individual droplets generated by a perturbation of an ink jet filament at a predetermined rate are each selectively charged by a charging electrical field applied to the droplets in the region where said ink jet filament breaks into said stream of droplets for deflection by an electrostatic deflection field, the method comprising the steps of:

during a sync test cycle, modulating said drop charging field to provide a series of narrow charging pulse fields for a portion of the time a drop is in said region at a repetition rate which is a sub-harmonic of said predetermined rate;

induction sensing the charging of said charged drops to provide charge sense signals;

amplifying said charge sense signals in a narrow frequency band centered at said modulation charge repetition rate;

accumulating said amplified signals for a predetermined period;

comparing said accumulated signal to a predetermined signal to detect a deviation of said modulation from a desired phase; and adjusting the relative phase of said perturbation and said modulation to correct any said detected deviation.

2. The method of claim 1 wherein said accumulating step comprises:

rectifying said amplifying signals; and integrating said rectified signals for a predetermined period.

3. The method of claim 1 additionally comprising the step of:

disabling said electrostatic deflection field during said sync test cycle.

4. In an ink jet recording system which comprises a source of conductive fluid, nozzle means for projecting said conductive fluid in a continuous stream, perturbation means operating at a predetermined rate to cause said continuous stream to break into a stream of substantially uniform droplets, charging means for selectively creating charging fields of predetermined duration to selectively impart charges to said droplets, deflection means for deflecting said charged droplets, gutter means for receiving substantially undeflected ones of said droplets, and synchronizing means for controlling the relative phase of said perturbation means and said charging means, the improvement comprising:

sync testing means for applying a series of test charge signals substantially narrower than said predetermined duration to said charging means at a repetition rate which is a sub-harmonic of said predetermined rate;

induction sensing means for sensing droplets charged by said test charge signals;

detection means for detecting in a narrow frequency band centered at said repetition rate and accumulating signals from said induction sensing means and phase detection means for comparing said accumulated signals to a predetermined level for supplying a phase indicating signal to said synchronizing means in response to said comparison.

5. The apparatus of claim 4 wherein said detection means comprises:

narrow band amplification means for filtering and amplifying said signals from said induction sensing means in said narrow frequency band centered at said repetition rate; and accumulation means for accumulating said amplified signals.

6. The apparatus of claim 5 wherein:

said induction sensing means is mounted at said gutter means.

7. The apparatus of claim 6 wherein said accumulation means comprises:

a rectifier for rectifying said amplified signals;

an integrator for integrating said rectified signals; and gate means for operating said integrator during the expected arrival time period at said induction sensing means of said test droplets.

8. The apparatus of claim 6 wherein:

said gutter is arranged to be an electrical shield;

said induction sensing means comprises an insulated wire mounted along and projecting from said gutter so that droplets entering said gutter move from an unshielded condition near said wire to a shielded condition with respect to said wire.

9. The apparatus of claim 8 additionally comprising:

means for disabling said deflection means during said application of test charge signals and continuing through operation of said detection means.

10. In an ink jet recording system which comprises a source of conductive fluid, nozzle means for projecting said conductive fluid in a continuous stream, perturbation means operating at a predetermined rate to cause said continuous stream to break into a stream of substantially uniform droplets, charging means for selectively creating charging fields of predetermined duration to selectively impart charges to said droplets, deflection means for deflecting said charged droplets, gutter means for receiving substantially undeflected ones of said droplets, and synchronizing means for controlling the relative phase of said perturbation means and said charging means, the improvement comprising:

a sync test circuit for applying a series of test charge pulses substantially narrower than and centered with respect to said predetermined duration to said charging means at a repetition rate which is a subharmonic of said predetermined rate;

an induction sensor for sensing droplets charged by said test charge signals;

a narrow band amplifier for filtering and amplifying said signals from said induction sensor in a narrow frequency band centered at said repetition rate;

an accumulation circuit for accumulating said amplified signals; and a phase indicating circuit for comparing said accumulated signals to a predetermined level and supplying a phase indicating signal to said synchronizing means in response to said comparison.

* * * * *